United States Patent [19]

Ohkanda

[11] Patent Number: 5,271,154

[45] Date of Patent: Dec. 21, 1993

[54] RECIPROCATING SAW BLADE UNIT

[75] Inventor: Masao Ohkanda, Sagamihara, Japan

[73] Assignee: Kioritz Corporation, Tokyo, Japan

[21] Appl. No.: 996,690

[22] Filed: Dec. 24, 1992

[30] Foreign Application Priority Data

Dec. 25, 1991 [JP] Japan .................. 3-106427[U]

[51] Int. Cl.$^5$ ................... A01D 34/14; A01D 34/13
[52] U.S. Cl. ................................ 30/216; 30/210
[58] Field of Search ............... 30/210, 216, 228, 369

[56] References Cited

U.S. PATENT DOCUMENTS

| | | |
|---|---|---|
| 3,083,457 | 4/1963 | Ottosen et al. |
| 3,316,636 | 5/1967 | Raper et al. ............ 30/210 |
| 3,579,827 | 5/1971 | Grahn . |
| 3,802,075 | 4/1974 | Taylor et al. |
| 4,856,195 | 8/1989 | Grossmann et al. ............ 30/369 |
| 5,031,324 | 7/1991 | Berghauser et al. ............ 30/369 |

FOREIGN PATENT DOCUMENTS 26422 1/1990 Japan .
460018 5/1992 Japan .

Primary Examiner—Douglas D. Watts
Attorney, Agent, or Firm—Browdy and Neimark

[57] ABSTRACT

A reciprocating saw blade unit has a pair of upper and lower separable-type saw blades. Each separable-type saw blade has the shape of a long and narrow plate and is composed of: a blade member having an engaging portion; and a power transmitting member which has an engaging portion and is connected to a driving member for slidingly reciprocating the power transmitting member along its longer dimension. The blade members and the power transmitting members are detachably coupled by using the engaging portions. The upper and lower engaging portions are arranged not to be overlapped each other at any event.

2 Claims, 4 Drawing Sheets

RECIPROCATING SAW BLADE UNIT

BACKGROUND OF THE INVENTION

The present invention relates to a reciprocating saw blade unit.

Reciprocating saw blade units are known as cutting units, such as grass-trimmers, for cutting trees and plants or the like, which slidingly and relatively reciprocate narrow and long plate-like saw blades along the longer dimension thereof. When a user wants to change or sharpen a saw blade, the user must open a case covering the eccentric cam portions, the crank mechanism and other members and disassemble the cam portions and the crank mechanism. This operation is rather troublesome and difficult for a general user.

SUMMARY OF THE INVENTION

Accordingly, an object of the present invention is to provide a reciprocating saw blade unit which has a simple construction and provides an economical advantage, more specifically, a reciprocating saw blade unit having a separable-type saw blade which facilitates changing and sharpening of saw blades by the user.

According to the present invention, a reciprocating saw blade unit has a pair of upper and lower separable-type saw blades each of which has a long and narrow shape and comprises: a blade member having an engaging portion; and a power transmitting member which has an engaging portion and is connected to a driving means for slidingly reciprocating the power transmitting member along its longer dimension. The blade member and the power transmitting member are detachably coupled to each other by using the engaging portions thereof.

The upper and lower engaging portions are arranged not to be overlapped on each other at any time.

Since, in a reciprocating saw blade unit according to the present invention, the saw blade is slidingly and relatively reciprocated along its longer dimension and composed of the blade member and the power transmitting member connected to the driving member, the two members being detachably connected by using engaging portions respectively formed in the members, the blade member can be easily detached simply by removing a guide member of the blade part. Further, the blade member can be attached simply by coupling the engaging portion to the engaging portion of the power transmitting member and putting back the guide member. Still further, since the blade member is separable from the power transmitting member, the respective materials of the two members can be separately selected so that the performance and durability of the reciprocating saw blade unit can be improved and the production cost can be reduced. Still further, since the upper and lower engaging portions are arranged not to be overlapped, on each other at any time, wear and vibration due to the engaging portions are reduced. The reciprocating saw blade unit of this invention is easy to use and facilitates a general user's operation, maintaining, checking and changing the blades.

Further objects, features and advantages of the present invention will become apparent from the following description of the preferred embodiment with reference to the attached drawings.

DESCRIPTION OF THE PREFERRED EMBODIMENT

The preferred embodiment of the present invention will be described hereinafter with reference to the drawings.

Figure 1:
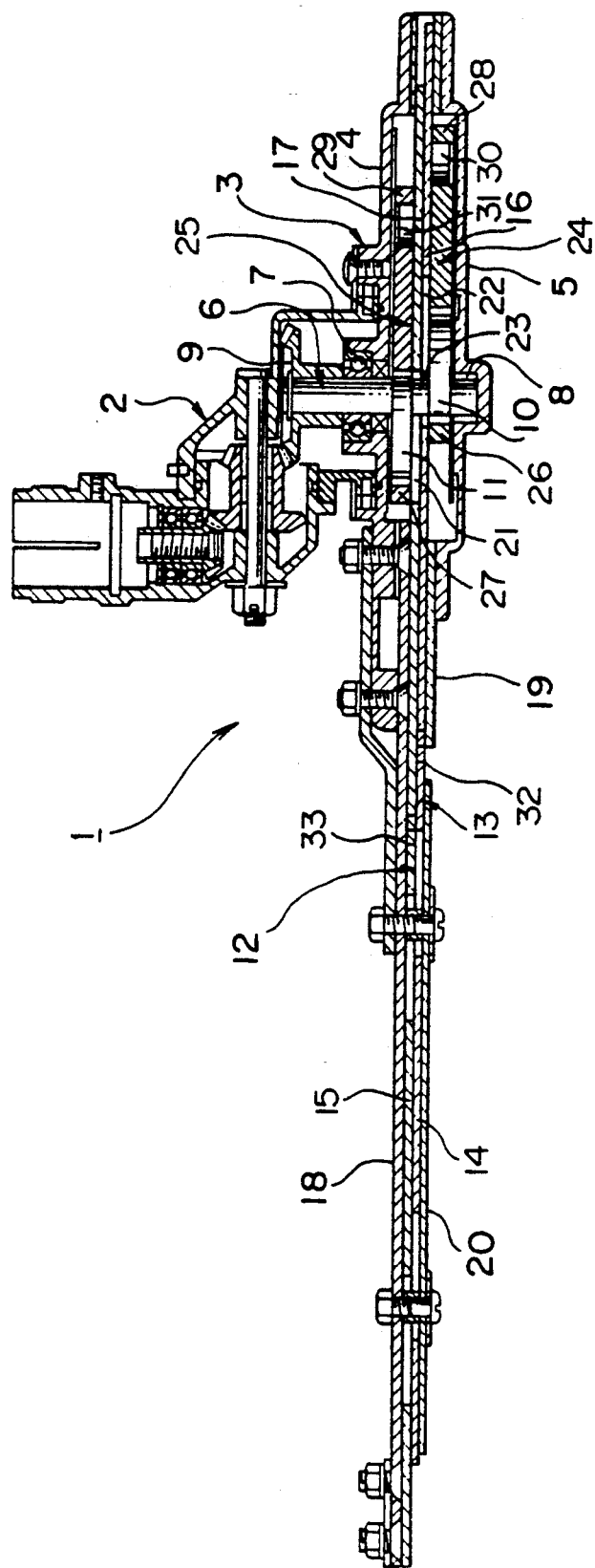
FIG. 1 is a longitudinal sectional view of a hedge-trimmer employing a reciprocating saw blade unit according to one embodiment of the present invention.
Figure 2:
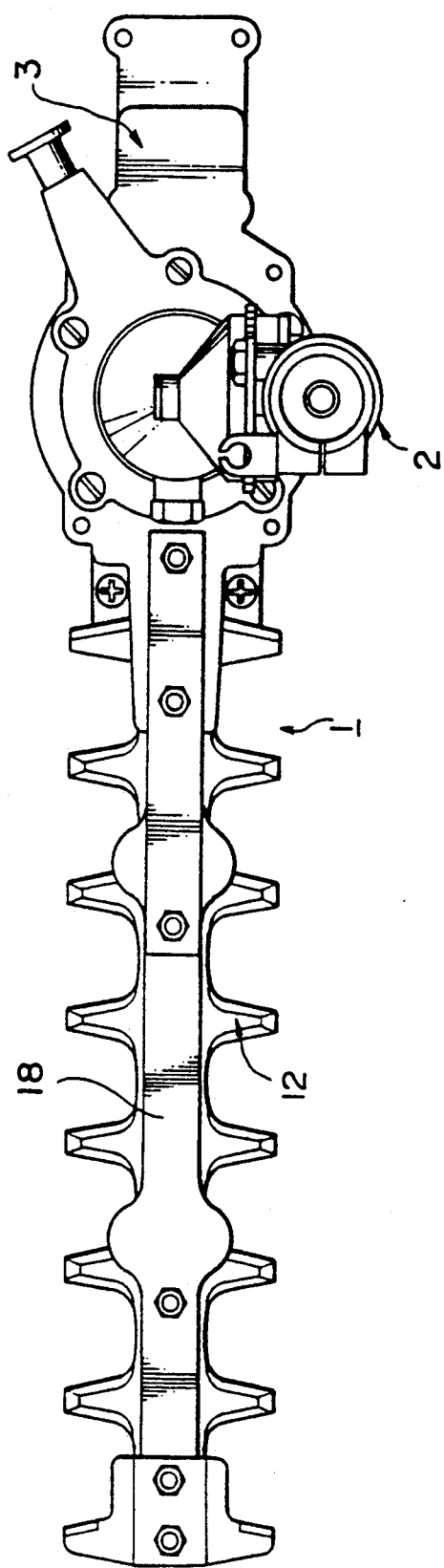
FIG. 2 is a plan view of the embodiment shown in FIG. 1.

Referring to FIGS. 1 and 2, a reciprocating saw blade unit 1 according to this invention comprises: a gear speed reducing means 2 connected to a front end portion of an operating rod (not shown) of a grasstrimmer; and a case 3 angle-variably connected to a front end portion of the gear speed reducing means 2. The case 3 is composed of an upper-half body 4 and a lower-half body 5 which are coupled by a plurality of bolts. The case 3 rotatably supports a main shaft 6 vertically by means of bearings 7 and 8. The main shaft 6 is driven by means of a transmission shaft (not shown) of the operating rod. More specifically, the main shaft 6 is rigidly coupled to an output gear 9 of the gear speed reducing means 2. A pair of eccentric circular cams 10 and 11 are formed together with the main shaft 6. The upper and lower eccentric circular cams 10 and 11 are spaced apart from each other and have angle phases which are 180° different from each other.

Figure 3:
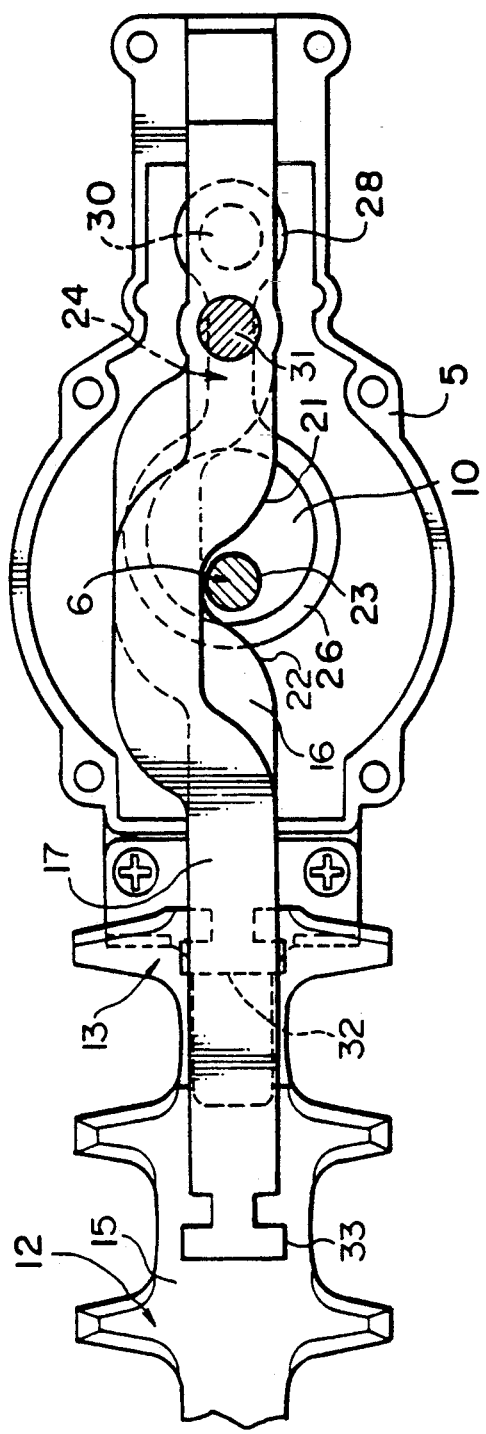
FIG. 3 is a partial sectional view of a separable-type saw blade according to the present invention, illustrating a power transmitting member and a blade member.
Figure 4:
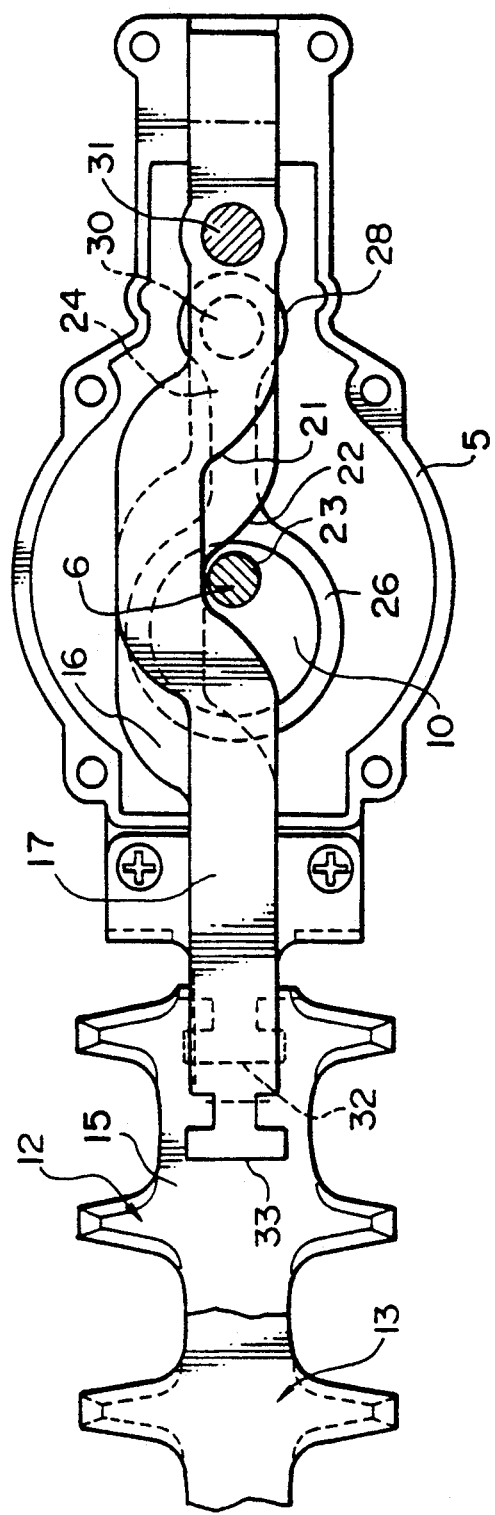
FIG. 4 is a partial sectional view of the separable-type saw blade shown in FIG. 3 in another state.

Referring to FIGS. 3 and 4, a pair of upper and lower separable-type saw blade 12 and 13 are formed in the shape of long and narrow plates and provided so that the rear-end portions of the saw blades are housed in the case 3 and the other portions of the saw blades protrude outwardly from the case 3. Inside the case 3, power transmitting members 16, 17 of the upper and lower separable-type saw blades 12, 13 are supported by the case 3. Outside the case 3, blade members 14, 15 are supported by an upper guide member 18 and lower guide members 19, 20, respectively (see FIG. 1). Front end portions of the power transmitting members 16, 17 and rear end portions of the blade members 14, 15 are detachably coupled together, respectively, by engaging T-shape dovetail-groove coupling portions 32, 33 formed in the front and rear end portions of these members. The upper and lower engaging T-shape dovetail-groove coupling portions are arranged not to be overlapped on each other at any time. Thus, the power transmitting members 16, 17 and the blade members 14, 15 are provided slidably back and forth as assembled separable-type saw blades. The power transmitting members 16, 17 have horizontally curved portions 21, 22 in central portions thereof, respectively, inside the case 3. The horizontally curved portions 21, 22 are positioned so as to be supported between the upper and lower eccentric cams 10, 11 and extend around one side of a central portion 23 of the main shaft 6. Thus, the power transmitting members 16, 17 can be reciprocated without bumping the main shaft 6, and the positions of the members can be more strictly restricted.

The eccentric cams 10 and 11 are rotatably fitted, respectively in larger end portions 26, 27 of connecting rods 24 and 25 as driving members. The connecting rods 24, 25 extend along the upper and lower sides of the power transmitting members 16, 17, respectively, and the smaller end portions 28, 29 of the connecting rods 24, 25 are journaled to the power transmitting members 16, 17 by pins 30, 31, respectively. When the main shaft 6 is rotated by the gear speed reducing means 2, the power transmitting members 16, 17 are reciprocated in phases opposite to each other, by means of the eccentric cams 10, 11 and the connecting rods 24, 25. Thus, the blade members 14, 15 are reciprocated together with the power transmitting members 16, 17.

Although both the upper and lower saw blades are reciprocated in the above embodiment, one of the blades may be fixed in position. Further, the dovetail-groove coupling portions may be formed other than in the shape of a "T" to facilitate forming and substantially prevent stress from being concentrated in any area.

While the present invention has been described with reference to what are presently considered to be the preferred embodiment, it is to be understood that the invention is not limited to the disclosed embodiment. To the contrary, the invention is intended to cover various modifications and equivalent arrangements included within the spirit and scope of the appended claims.

What is claimed is:

1. A reciprocating saw blade unit comprising;
   a pair of upper and lower separable-type saw blades each of which have the shape of a long and narrow plate;
   said pair of upper and lower separable-type saw blades being slideably engaged over their length;
   each blade of said pair of upper and lower separabletype saw blades having a first engaging portion;
   a pair of power transmitting members each having a second engaging portion;
   each of said pair of power transmitting members connected to a driving means for sliding and relative reciprocation of each of said pair of power transmitting members along a longitudinal length of said transmitting members;
   said each blade and said each of said pair of power transmitting members forming a detachable coupling by engagement of said first engaging portion and said second engaging portion;
   wherein each of said detachable coupling formed between said each blade member and said each of said pair of power transmitting members are continuously spaced apart along a longitudinal axis of said saw blade unit while said driving means is reciprocating said pair of power transmitting members and said pair of upper and lower separable-type saw blades.

2. A reciprocating saw blade unit according to claim 1, wherein said each said detachable coupling has a dovetail-groove formed in the shape of a "T".

* * * * *